United States Patent [19]

Lösch et al.

[11] Patent Number: 4,678,048

[45] Date of Patent: Jul. 7, 1987

[54] APPARATUS FOR THE CONTACTLESS COUPLING OF A SUSPENDED PART TO FORCE MEASURING DEVICE

[76] Inventors: Hans-Wilhelm Lösch, Emscherstrasse 8,, 4630 Bochum 1; Rainer Kleinrahm, Röntgenring 2, 4030 Ratingen; Norbert Pieperbeck, Barlachweg 42, 4630 Bochum 1; Wolfgang Wagner, Virchowstrasse 7, 4630 Bochum 1, all of Fed. Rep. of Germany

[21] Appl. No.: 760,657

[22] Filed: Jul. 30, 1985

[30] Foreign Application Priority Data

Aug. 2, 1984 [EP] European Pat. Off. ........ 84109178.8

[51] Int. Cl.$^4$ .......................... G01G 7/00; G01G 3/14
[52] U.S. Cl. .............................. 177/212; 177/210 EM
[58] Field of Search .......................... 177/210 EM, 212

[56] References Cited

U.S. PATENT DOCUMENTS

| | | | |
|---|---|---|---|
| 3,089,553 | 5/1963 | Gast | 177/210 EM X |
| 3,322,222 | 5/1967 | Baur | 177/210 EM |
| 3,498,397 | 3/1970 | De Santo | 177/210 EM |
| 3,519,095 | 7/1970 | Tomes | 177/210 EM |
| 3,799,281 | 3/1974 | Wernitz | 177/212 X |
| 3,968,850 | 7/1976 | Gaskill | 177/212 X |
| 4,236,590 | 12/1980 | Knothe et al. | 177/212 X |
| 4,373,596 | 2/1983 | Kunz | 177/212 |

*Primary Examiner*—George H. Miller, Jr.
*Attorney, Agent, or Firm*—Banner, Birch, McKie & Beckett

[57] ABSTRACT

The invention relates to an apparatus for the contactless coupling of a suspended part 9, provided with a magnet 12 and located in a housing 6 to a force measuring device outside housing 6 and which is provided with a controllable electromagnet 1. Unlike in known apparatuses of this type, the position change of the suspended part 9 is recorded in absolute terms with respect to housing 6 and used for controlling electromagnet 1. This gives greater freedom in the design of housing 6, which can now be designed for a wider temperature and pressure range than hitherto, because no longer is it necessary to take account of a distance measurement through the housing wall.

12 Claims, 4 Drawing Figures

APPARATUS FOR THE CONTACTLESS COUPLING OF A SUSPENDED PART TO FORCE MEASURING DEVICE

BACKGROUND OF THE INVENTION

The invention relates to an apparatus for the contactless coupling of a suspended part to a force measuring device, in which the suspended part is located within a housing and is provided with a magnet and the device for measuring a force is provided with a controllable electromagnet, the latter being controlled in accordance with a measuring device for determining the reciprocal spacing of both magnets, i.e. with the aid of a control loop for maintaining this spacing.

Said apparatus is always used if a force measurement cannot or is not to take place in the housing, because e.g. the force measuring device cannot or should not be exposed to the conditions prevailing in the measurement area. This can be the case with corrosive media, or if incompatibility is caused by a corresponding pressure in the measurement area.

Such an apparatus for the contactless coupling of a suspended part to a force measuring device is e.g. described in DE-AS No. 11 64 114. The upper part of a load pan suspended on a balance acts through a housing on the lower part of the load pan constructed as a suspended part, the measurement of the position change of the suspended part relative to the upper part of the load pan taking place through the housing wall at the same point at which force coupling takes place with the aid of magnetic forces. At this point, a measured signal and a power signal are consequently superimposed and it is virtually impossible to exclude their reciprocal influencing. It is correspondingly difficult to work with this apparatus.

The same publication also proposes measuring the position change of the suspended part with respect to the force measuring device by using electro optical procedures, the reference system being fitted to the electromagnet, i.e. to the force measuring device. Although this modification virtually excludes disturbances, particularly of the measurement signal by a power signal, the housing must be made light-permeable at the corresponding point or points. It is common to both constructions, that the housing is subject to severe restrictions regarding the material selection at the coupling point or the passage point for the electro optical measuring device. In one case it is not even possible to use a diamagnetic or paramagnetic, electrically conductive material and in the other a distortion-free light permeability is required. Thus, measurements cannot take place under high pressure. In addition, only simple systems can be used for measuring the position change and they do not permit a differential measurement with oppositely superimposed action. The sinsitivity is correspondingly low and it is further reduced by the fact that spacing measurement must take place over a relatively great distance through the housing wall.

The problem of the invention is therefore to so modify an apparatus of the aforementioned type, that with respect to the measuring device for determining the position change of the suspended part there are no longer any restrictions regarding the design of the housing or such devices, so that the range of investigations and tests within the housing is drastically extended by the choice of the housing materials and the quality of the suspension regulation can be considerably improved by the use of more accurate position measuring devices.

SUMMARY OF THE INVENTION

The invention proposes that the measuring device for determining the suspended part position is arranged in fixed manner on the housing and particularly within the latter and that instead of maintaining the spacing of the magnets, the maintaining of a predetermined desired position of the suspended part relative to the housing determines the control of the electromagnet.

Attempts have hitherto been made to maintain a quasi-rigid connection between the suspended part and the part of an apparatus of the present type associated with the force measuring device. This type of quasi-rigid connection through a housing wall requires a direct spacing measurement between the facing parts of the coupling point or a fixed upper part and the present invention moves away from this. Instead the position of the suspended part relative to the housing is kept constant, so that it is possible to allow a variation of the spacing between the facing ends of the coupling point. Thus, for example during the complete coupling state, it is possible to give a constant desired position of the suspended part relative to the housing and this is also maintained if the coupling point part associated with the force measuring device oscillates to a moderate extent. The predetermined desired position can be varied in such a way during the coupling state, that the control charge of the electromagnet oscillates about a predetermined constant value, i.e. about a basic load value. In this variant, the spacing of the suspended part from the electromagnet is quasi constant and varies only as a function of the absolute loading.

In addition to the above-described construction of an apparatus according to the invention, it can be appropriate in the case of specific disturbance movements of the electromagnet brought about by the force measuring device to determine same with a second position measuring device arranged outside the housing and to take account thereof as a regulating disturbance variable in the control of the electromagnet. This greater expenditure is eg. necessary if the speed of the movements of the electromagnet is close to the speed of the position correction of the suspended part. However, if only slow electromagnet movements are expected, this additional expenditure is not required.

The positioning of the measuring device for determining the position change of the suspended part in fixed manner on the housing not only leads to measuring advantages, i.e. highly accurate differential measurements for determining the position change of the suspended part, but more particularly also leads to a greater freedom in the design of the housing, enabling the performance of high pressure measurements under operating pressures of up to 1000 bar and higher, as well as combined measurements at high temperatures and high pressure. A paramagnetic or diamagnetic, metallic material can now be used for the coupling point, because only magnetic holding forces are applied at this point, which are transferred in substantially disturbance-free manner through the housing wall. It is particularly advantageous to use for the coupling point e.g. a high-purity, precipitation-hardened copper-beryllium alloy, which e.g. withstands high pressures.

For the measuring device for determining the position change of the suspended part, in the case of the arrangement according to the invention on or in the housing, numerous variants are available, namely all highly accurate measuring systems for performing a differential measurement. For example, it is possible to provide two coils associated with the housing and a disc associated with the suspended part and positioned between the coils. It is also possible to have two discs, a shield being provided between each measuring system comprising a disc and a coil. The measurement can take place according to the flux displacement measuring principle or according to the induction change measuring principle. The materials of the disc or discs are selected accordingly and the coils are embedded in a corresponding housing. Cores, immersed in corresponding coils can be used in place of the disc or discs. The coils can be placed inside or outside the housing, whereby in the case of an arrangement inside the housing, it is necessary to provide vacuum-tight or pressure-tight line passages to the outside. It is obviously also possible to use photoelectric, capacitive or ultrasonic primary elements.

Force measuring devices equipped with the apparatus according to the invention are generally so sensitive that in the case of measurements, particularly over a long period, a so-called zero drift can occur, which is characterized in that as a result of external influences, the reading at zero loading already gives a value. Admittedly the correction can be carried out very easily, e.g. through the conventional tare function or the like, however, it is necessary to recognize the need for the correction. Similar conditions apply regarding a calibaration displacement, i.e. a change in the proportionality of the reading.

In order to counteract these problems, the invention proposes a further development, in that the suspended part is selectively or additonally also loadable with a reference mass and optionally also a calibrating mass. Through a load change on the suspended part from the operating load to the e.g. approximately equally heavy reference mass, the weight force of the known mass is determined, so that a possible zero displacement can be discovered and eliminated. The additional application of a calibrating mass then makes it possible to check or correctly set the proportionality, because in addition to the known size of the reference mass an also known force quantity is added, so that it is possible to carry out a complete calibration of the device for measuring a force.

Each mass is preferably housed in a separate portion of the housing, which is optionally thermally isolated from the remaining housing, particularly the actual measurement area.

It can be appropriate for a particularly trouble-free force transfer through the coupling point if, above the electromagnet, is provided an outwardly force-neutral damping member, which can be constructed in mechanical-hydraulic or mechanical-electric manner. Thus, oscillations resulting from disturbances are only passed in a damped manner to the force measuring device.

In order that the complete measuring process can take place automatically in accordance with a predetermined program for a long period, it is appropriate to use a process computer, which digitally controls, monitors and evaluates the complete measurement process.

BRIEF DESCRIPTION OF THE DRAWINGS

Embodiments of the invention are described in greater detail herinafter relative to the drawings, wherein show.

DETAILED DESCRIPTION OF THE INVENTION

Figure 1:
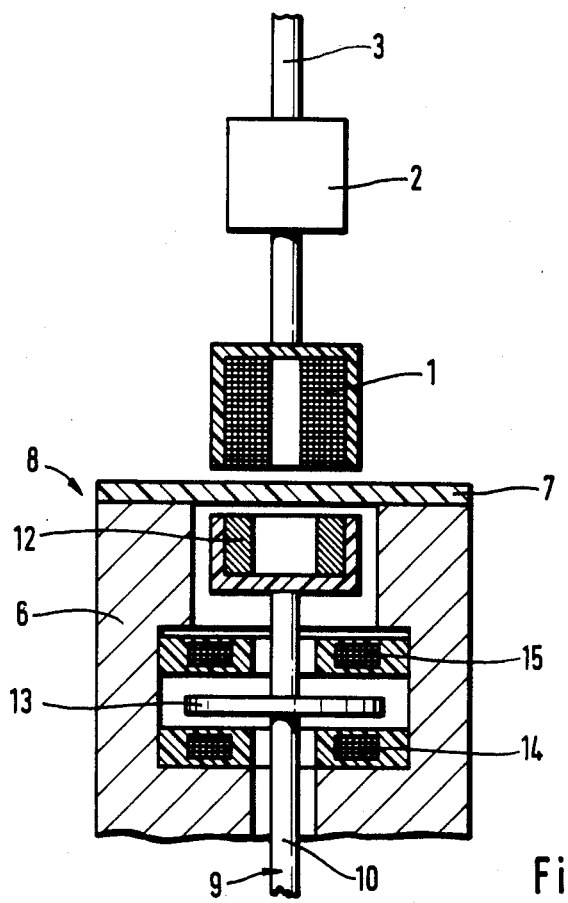
FIG. 1 a diagrammatic cross-sectional view of the apparatus according to the invention in conjunction with a partly represented housing.

The apparatus shown in FIG. 1 is a component of a measuring system for determining the weight change of bodies or liquids to be investigated on the basis of a density change, a chemical reaction, or for absorption measurements or thermogravimetric measurements. In each case there is a force measuring device, an electromagnet 1 being fitted to its free end 3. Between the free end 3 and the electromagnet, it is possible to insert a damping element 2, which is used for suppressing disturbance forces between the force measuring system and the suspension system below the electromagnet 1.

Below electromagnet 1 is provided a housing 6, within which the weight change to be measured takes place, the external conditions being approximately freely selectable. Thus, the housing makes it possible to set specific temperatures, pressures and also the filling with specific gases, whilst also to a certain extent permitting manipulations, e.g. changes to the temperature, gas, etc. In conjunction with the invention, it is merely a question of there being a weight change within the housing 6, which is transferred as accurately as possible to the free end 3 and consequently to the force measuring device.

Immediately below an upper cover 7, which terminates housing 6 at the top, is provided a measuring device 8, which records a position change of a suspended part 9, on which the force change directly or indirectly acts. In the represented embodiment, the suspended part comprises a bar 10. However, it can also be a platinum wire or any other tensile force-transferring element, whose design is dependent on the measurement to be carried out.

At the upper end of bar 10 is provided a permanent magnet 12, which is attracted to such an extent by the controlled electromagnet 1, that it assumes a suspended or floating position. This suspended state is unstable and must be stabilised by a permanent oscillation about the instable position of equilibrium. This function is fulfilled by measuring device 8, which provides information on the position change of bar 10 and consequently permanent magnet 12 and by means of corresponding intermediate elements influences the control of electromagnet 1. The position change is determined with the aid of a disc 13, a lower coil 14 and an upper coil 15, which is known, the measurement being performed by means of a flux displacement or an induction change. The material for disc 13 and the embedding material for coils 14 and 15 are chosen as a function thereof.

According to a first variant of the invention, a predetermined desired position of the bar and consequently disc 13 relative to coils 14 and 15 is maintained. This means that the spacing between the electromagnet 1 and the permanent magnet 12 can vary at random within wide limits, the weaker magnetic action in the case of larger distances being compensated by a corresponding strong charge of electromagnet 1.

According to a variant, a more extensive control of the suspended state can be used. For this purpose, electromagnet 1 is controlled with a specific basic load, which e.g. brings about a median suspended position of suspended part 9. The actual control signal oscillates about this basic load, which consequently swings around the value zero. However, what is decisive for the position of suspended part 9 is still the desired position relative to housing 6, which is however influenced by the basic load of electromagnet 1. Thus, electromagnet 1 and permanent magnet 12 are coupled to one another in a quasi-rigid manner. However, the distance between these two parts is dependent on the loading of the suspended part. With a varying load, a greater proximity of perment magnet 12 to electromagnet 1 is necessary, so that in the case of constant basic load the magnetic forces are greater as a result of the smaller spacing, namely of the same magnitude as the load increase compared with the previous state.

The decision as to which of the aforementioned variants is used, is made on the basis of the intended use and the particular force measuring device employed.

Figure 2:
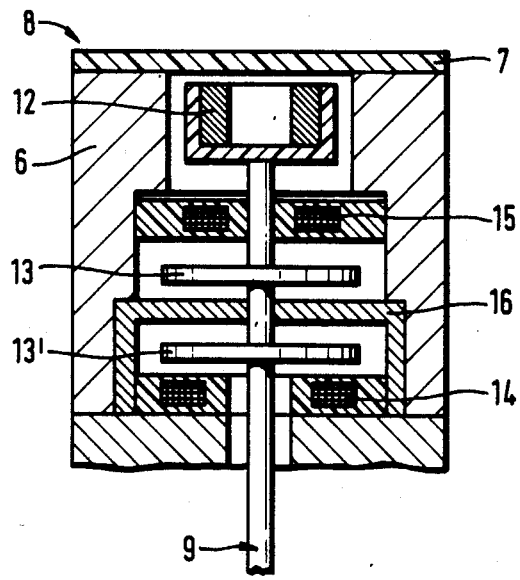
FIG. 2 a view according to FIG. 1 of a further embodiment of the invention.

According to the embodiment of FIG. 2, measuring device 8 has a more complicated construction. With the lower coil 14 is associated a separate disc 13' and upper coil 15 also reacts to the moving in or out of the plate 13 associated therewith. This permits an even more accurate position determination, because the two systems, in each case comprising a coil and a plate, can be shielded from one another, i e. cannot reciprocally influence one another. For this purpose a shield 16 is provided, which also serves as a support for disc 13 and consequently for the complete suspended part 9 in the inoperative position, i.e. in the measuring intervals. Starting from the inoperative position and the raising of the suspended part 9 therefrom takes place automatically by means of a regulator, whilst the following sequence is adopted.

Before the start of coupling between electromagnet 1 and permanent magnet 12, disc 13 rests as a support on shield 16. A starting desired value position is now stored in the regulator and which in the case of a corresponding control leads to the disc 13 being raised from shield 16. This first movement of suspended part 9 which is in the hundredths of a millimetre range is virtually covered in a jump, but this is very smooth in view of the shortness of the distance and the mass. This step merely leads to the completion of the transition from resting to suspension. From this starting desired value position, the actual operating desired position is preferably continuously controlled, which is linked with a permanent decrease in the overall activation of electromagnet 1, because there is a constant decrease in the distance between electromagnet 1 and permanent magnet 12. On this approximation is superimposed the high frequency regulation, so as to replace the otherwise unstable equilibrium by a stable equilibrium.

A similar process takes place at the end of coupling. According to a predetermined lowering program, the suspended part 9 is preferably continuously lowered into a deposition desired value postion, which generally corresponds to the starting desired value position. There is still just a suspended state, which on further lowering of suspended part 9 passes more or less abruptly into a support or bearing state. This transfer is once again not accompanied by small impacts or jumps, because the "height of fall" is too small for suspended part 9 to undergo a significant speed increase.

In the embodiment according to FIG. 1, the lower coil 14 can obviously serve as a support for disc 13. Thus, no separate shield 16 is required in accordance with the embodiment of FIG. 2. However, diverging therefrom, it is possible to provide at a random point a separate support for the inoperative period and on which suspended part 9 is deposited with a corresponding surface. However, this support should not be positioned too far from measuring device 8, so that a length change to bar 10, e.g. due to a temperature fluctuation does not lead to the limited transition path from the lying state to the suspended state being lost or becoming excessive.

Figure 4:
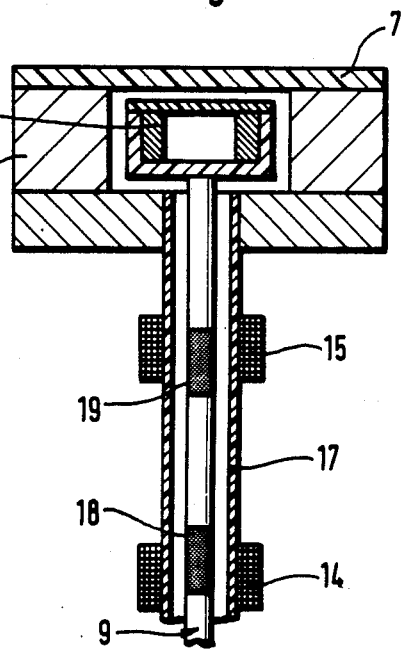
FIG. 4 a view according to FIG. 2 of a further embodiment of the invention.

FIG. 4 shows a particularly inexpensive, but adequately accurate measuring device consisting of the already mentioned measurement on the basis of an induction change in sensor coils 14,15 with the aid of ferromagnetic cores 18,19. Sensor coils 14,15 are fitted to the outside of a pressure-tight, non-magnetic pipe 17, whilst the ferromagnetic cores 18,19 form part of the suspended part 9. It is clear that this device also permits a differential measurement and that a good measuring accuracy is achieved.

In the represented embodiments below measuring device 8, housing 6 or pipe 17 is shown in broken away form in FIG. 4. This can be followed by randomly designed chambers or measurement areas, whose configuration is dependent on the intended function and which can be provided with connections and passages. Such a design e.g. includes a separate housing part for housing a reference mass, as well as a calibrating mass, which can be constructed in the form of rings and can be lowered onto corresponding discs on bar 10. As a function of the volume relationships and the intended measurement, it is also possible to house each mass in the actual measurement area or in an area located above it and which is thermally isolated therefrom.

Figure 3:
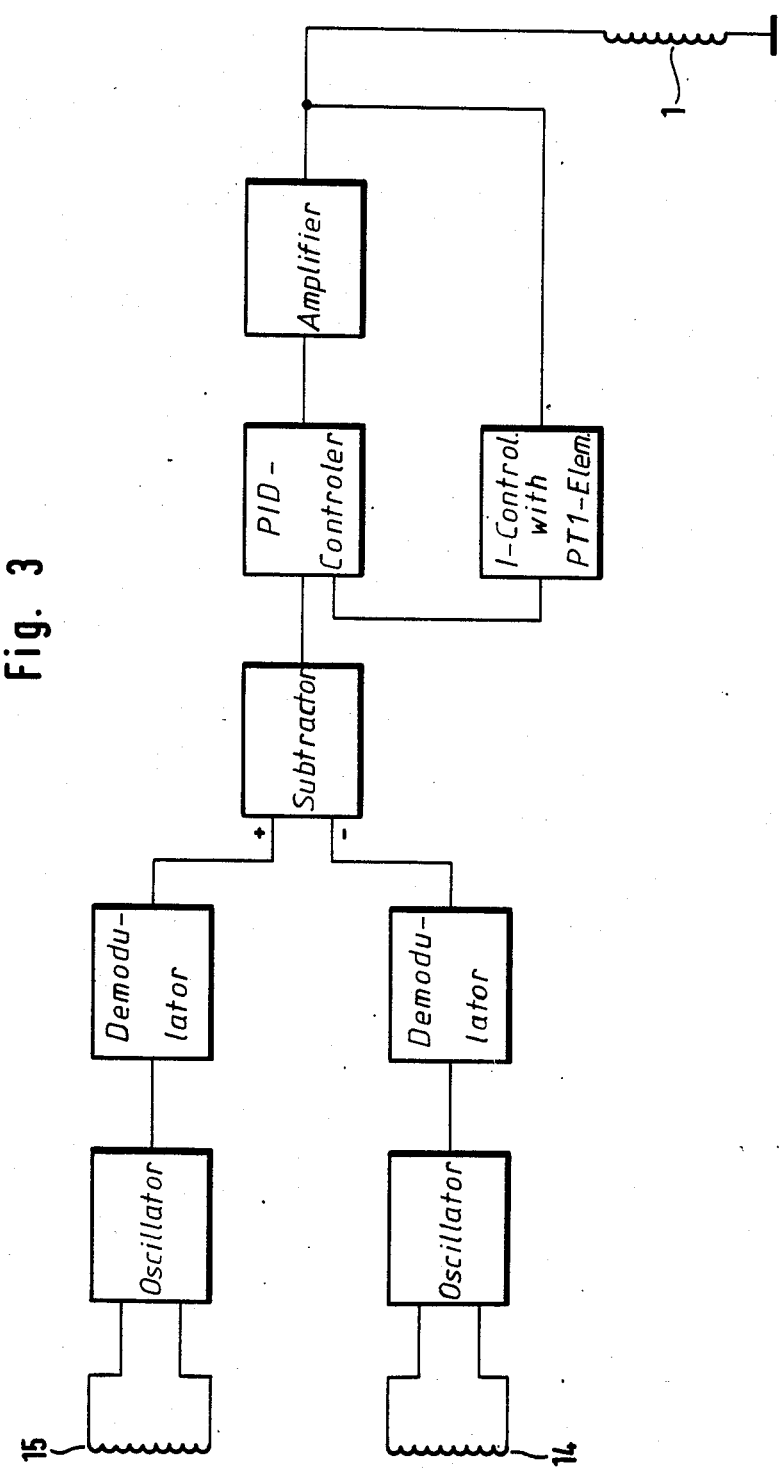
FIG. 3 a diagrammatic block circuit diagram for regulating the coupling forces in an apparatus according to the invention.

FIG. 3 shows a block circuit diagram for illustrating the control of the electromagnet 1 according to the differential measurement with the aid of coils 14,15. Coils 14,15 controlled in each case by an oscillator, vary their inductance in the case of a position change of disc 13, or discs 13, 13' or ferromagnetic cores 18, 19, which lead to a change in the natural frequency of the oscillator. The natural frequency of the oscillator is continuously demodulated and converted into a direct current signal proportional to the natural frequency. The direct current signals of both coils 14,15 are superimposed in opposite direction in a subtractor, which leads to an amplification of the overall signal. In a proportional-integral-derivative controller (PID-controller), the input signal is converted in a very short time into a control signal, which is supplied by means of a power amplifier to electromagnet 1. Each position change of disc 13, or discs 13,13', or ferromagnetic cores 18,19 with respect to coils 14,15 consequently leads to a corresponding control value at electromagnet 1.

The desired value given to the PID-controller can, as desired, be kept constant, or can be modified by an integral controller using a PT1-element, whose input quantity is the power of electromagnet 1. In the second case, a basic load value is supplied to electromagnet 1 and is positively or negatively superimposed for maintaining the stable state of equilibrium. FIG. 3 does not show the various possiblities of giving the desired value.

What is claimed is:

1. Apparatus for the contactless coupling of a suspended part to a force measuring device, comprising a stationary housing for enclosing the suspended part with the force measuring device being above the housing, an electromagnet at the end of the measuring device facing said housing, a permanent magnet at the top of the suspended part adjacent the electromagnet, a second measuring device for measuring movements of the suspended part and thus of the permanent magnet, and a control loop electrically connected to said second measuring device and said electromagnet for receiving an input signal from said second measuring device and giving an output signal to said electromagnet to keep the suspended part in suspension, the improvement comprising said second measuring device being stationarily attached to said housing, for measuring the position of the suspended part relative to said housing in absolute terms against the stationary location of said housing and said control loop being connected to receive a value for the measured position, for comparing this value with a predetermined value of a preselected position and for controlling the electromagnet to keep the suspended part in its preselected position.

2. Apparatus according to claim 1, wherein the housing between the electromagnet and the permanent magnet is made from a metallic diamagnetic or paramagnetic, high-strength material, particularly a high purity, precipitation-hardened copper-beryllium alloy.

3. Apparatus according to claim 1 or 2, further comprising an integral regulator superimposing the control loop for letting oscillate the current of the electromagnet around a predetermined value independently from the coupling force.

4. Apparatus according to claim 1 or 2, wherein the second measuring device comprises a photoelectric, capacitive, ultrasonic or some other primary element.

5. Apparatus according to claim 1 or 2, further comprisng a damping element between the electromagnet and the first force measuring device, which is outwardly force-neutral and whose damping is accomplished by mechanical-hydraulical or mechanical-electrical forces.

6. Apparatus according to claim 1 or 2, further comprising at least one high frequency transformer for transmitting signals, especially measuring signals, from the suspended part to the housing, one winding of the transformer being associated to the suspended part and the other winding being associated to the housing.

7. Apparatus according to claim 1 or 2, wherein the second measuring device comprises two sensor coils positioned outward the housing and two ferromagnetic cores positioned adjacent the coils on the suspended part and wherein the housing consists of a non-magnetic pipe in the section where the coils are positioned.

8. Apparatus according to claim 1, further comprising a third measuring device positioned outside the housing for measuring the position of the electromagnet and a second regulator electrically connected to the third measuring device and the control loop for indicating the value of disturbance to be levelled by the control loop.

9. Apparatus according to claim 1, wherein a support is provided below the suspended part for supporting the suspended part in the inoperative position at the beginning and the end of a suspended state and wherein the preselected position of the suspended part relative to the housing is arranged just above the inoperative position.

10. Apparatus according to claim 1, wherein the second measuring device comprises two coils associated with the housing and a disc located between the coils and associated with the suspended part for carrying out a differential measurement.

11. Apparatus according to claim 10, further comprising two discs at a distance to each other and a shield between the two discs for eliminating a mutual influence of the coil-disc-units.

12. Apparatus according to claim 10 or 11, wherein each disc is made from a non-magnetic, good-electrically conducting material for a flux displacement measurement principle, or from a ferromagnetic material for an induction change measurement principle and wherein the coils are embedded in electrically non-conductive, non-magnetic winding carrier housings and at least in non-magnetic winding carrier housings.

* * * * *